United States Patent
Geekie et al.

(10) Patent No.: US 11,073,880 B2
(45) Date of Patent: Jul. 27, 2021

(54) MODEM THERMAL MANAGEMENT

(71) Applicant: QUALCOMM INCORPORATED, San Diego, CA (US)

(72) Inventors: James Francis Geekie, Carlsbad, CA (US); Henri Begin, Lyons, CO (US); Abha Khosla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/138,907

(22) Filed: Sep. 21, 2018

(65) Prior Publication Data

US 2019/0094929 A1 Mar. 28, 2019

Related U.S. Application Data

(60) Provisional application No. 62/565,040, filed on Sep. 28, 2017.

(51) Int. Cl.
| | | |
|---|---|---|
| *G06F 1/20* | (2006.01) | |
| *G05B 19/042* | (2006.01) | |
| *H04W 52/02* | (2009.01) | |
| *G06F 1/3234* | (2019.01) | |
| *G06F 1/3206* | (2019.01) | |

(52) U.S. Cl.
CPC ......... *G06F 1/206* (2013.01); *G05B 19/0428* (2013.01); *G06F 1/203* (2013.01); *G06F 1/325* (2013.01); *G06F 1/3206* (2013.01); *G06F 1/3278* (2013.01); *H04W 52/0251* (2013.01); *H04W 52/0274* (2013.01); *G05B 2219/21156* (2013.01)

(58) Field of Classification Search
None
See application file for complete search history.

(56) References Cited

U.S. PATENT DOCUMENTS

| | | | |
|---|---|---|---|
| 6,697,963 B1 | 2/2004 | Nouri et al. | |
| 6,826,456 B1 * | 11/2004 | Irving | G06F 1/20 361/695 |
| 9,323,296 B2 | 4/2016 | Ngai et al. | |
| 9,465,423 B2 | 10/2016 | Vadakkanmaruveedu et al. | |
| 2002/0173858 A1 | 11/2002 | Sherlock | |

(Continued)

FOREIGN PATENT DOCUMENTS

WO 2009143487 A2 11/2009

OTHER PUBLICATIONS

International Search Report and Written Opinion—PCT/US2018/052303—ISA/EPO—dated Dec. 12, 2018.

*Primary Examiner* — Kenneth M Lo
*Assistant Examiner* — Istiaque Ahmed
(74) *Attorney, Agent, or Firm* — Qualcomm Incorporated

(57) ABSTRACT

Modem thermal management may include a state machine monitoring a temperature associated with a modem, setting a mode in response to detection of a change in the temperature with respect to a threshold, and applying a set of one or more thermal mitigation actions associated with a current state of the state machine. The state machine may set a timer in response to detection of the change in temperature and then transition from the current state to another state in response to expiration of the timer. The monitored temperature may be a junction temperature or a skin temperature.

17 Claims, 12 Drawing Sheets

(56) References Cited

U.S. PATENT DOCUMENTS

| | | | |
|---|---|---|---|
| 2003/0135767 A1* | 7/2003 | Chu | H05K 7/20209 |
| | | | 713/300 |
| 2009/0290625 A1* | 11/2009 | Riddle | G06F 1/206 |
| | | | 375/222 |
| 2012/0075992 A1* | 3/2012 | Shahidi | H04W 52/0251 |
| | | | 370/235 |
| 2013/0039173 A1* | 2/2013 | Ehsan | H04W 52/146 |
| | | | 370/229 |
| 2015/0282069 A1* | 10/2015 | Hobbs | H04W 24/02 |
| | | | 370/252 |
| 2015/0296455 A1* | 10/2015 | Yamazaki | H04W 72/042 |
| | | | 370/311 |
| 2017/0099204 A1 | 4/2017 | Park et al. | |
| 2017/0188310 A1 | 6/2017 | Kocagoez et al. | |

* cited by examiner

MODEM THERMAL MANAGEMENT

CROSS-REFERENCE TO RELATED APPLICATION

The benefit of and priority to U.S. Provisional Patent Application No. 62/565,040, filed Sep. 28, 2017, entitled "MODEM THERMAL MANAGEMENT," is hereby claimed, and the contents thereof incorporated herein by this reference in their entirety as if fully set forth below and for all applicable purposes.

DESCRIPTION OF THE RELATED ART

Portable computing devices ("PCDs") are becoming necessities for people on personal and professional levels. PCDs may include cellular telephones, portable digital assistants, portable game consoles, palmtop computers, and other portable electronic processing devices.

A PCD includes various electronic subsystems and components, such as a system-on-chip ("SoC"). An SoC may include, for example, central processing units ("CPUs"), graphics processing units ("GPUs"), and digital signal processors ("DSPs"). A PCD may include a modem, among other components. The modem may be a portion of the SoC or may be a discrete chip.

In operation, the electronic circuitry within a PCD generates heat or thermal energy, which at excessive levels may be detrimental to the circuitry or burn a user's hand. The amount of thermal energy that is generated may vary depending upon the operating conditions. For example, processors may generate substantial thermal energy when operating at high workload levels or data rates.

Some PCDs include thermal sensors positioned near the electronic circuitry that are monitored to determine if the PCD or portion thereof has reached a threshold or critical temperature. When a reading of the thermal sensor indicates that a PCD has reached such a threshold temperature, an action intended to reduce thermal energy production or otherwise mitigate adverse effects of the thermal energy may be initiated. For example, the voltage or frequency applied to a processor may be reduced. Using temperature feedback to adjust how a PCD operates is sometimes referred to as "thermal management" or "thermal mitigation," Generally, there is a tradeoff between PCD performance (e.g., quality of service or "QoS") and thermal mitigation. Aggressively or coarsely adjusting operating parameters to reduce thermal energy production may adversely impact QoS or other PCD performance characteristics. Improvements in communications technologies offer higher data rates and, correspondingly, demand more nuanced thermal management techniques.

SUMMARY OF THE DISCLOSURE

Methods, systems, and computer program products are disclosed for modem thermal management.

An exemplary method for modem thermal management may include monitoring a temperature associated with a modem, setting a mode of a state machine in response to detection of a change in the temperature with respect to a threshold, and applying a set of one or more thermal mitigation actions associated with a current state of the state machine.

An exemplary system for modem thermal management may include one or more thermal sensors and a state machine configured to control: monitoring a temperature associated with a modem, setting a mode of a state machine in response to detection of a change in the temperature with respect to a threshold, and applying a set of one or more thermal mitigation actions associated with a current state of the state machine.

An exemplary system for modem thermal management may include means for monitoring a temperature associated with a modem, means for setting a mode of a state machine in response to detection of a change in the temperature with respect to a threshold, and means for applying a set of one or more thermal mitigation actions associated with a current state of the state machine.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Figure 1:
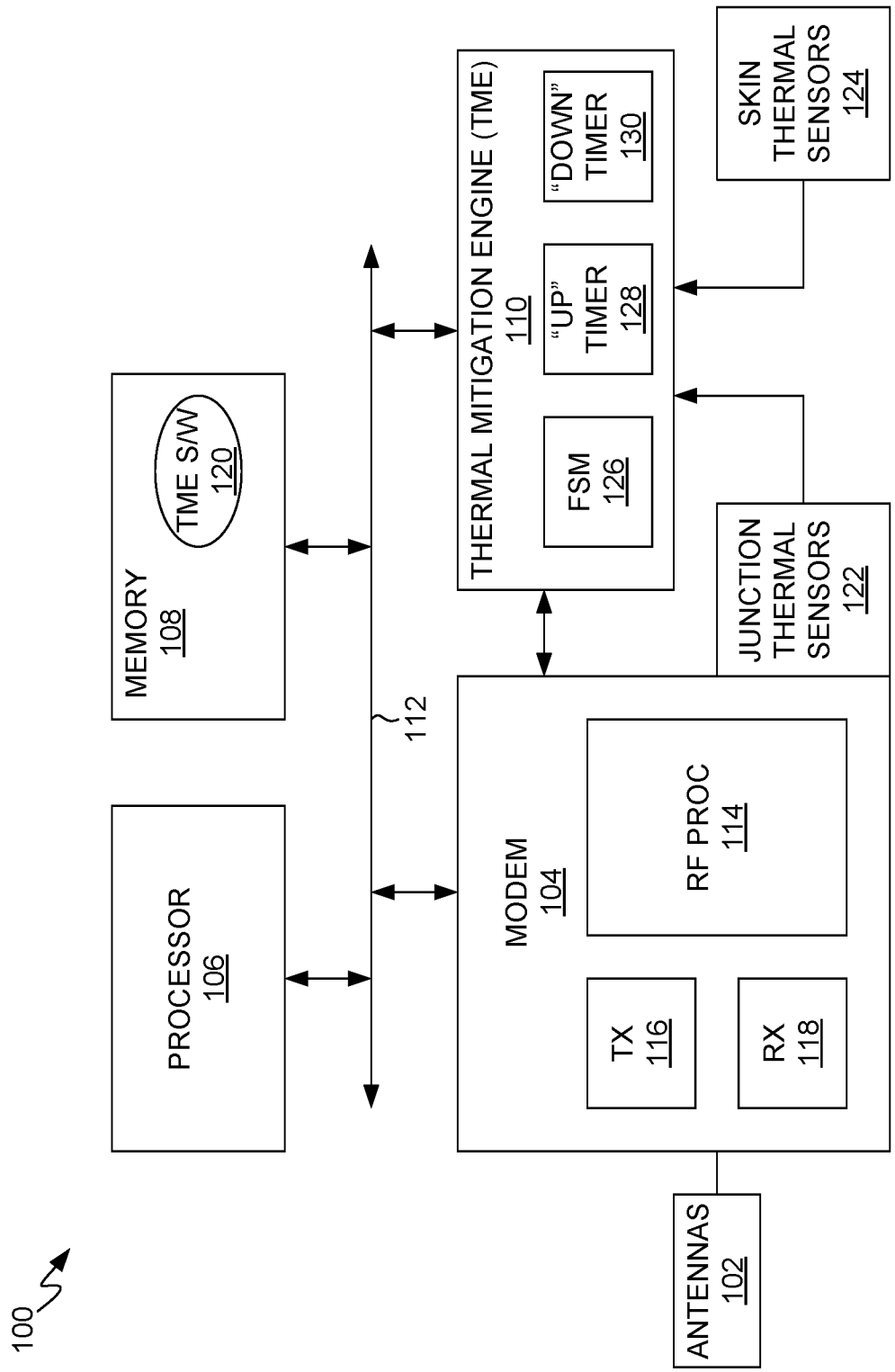
FIG. 1 is a block diagram of portion of a user equipment ("UE") having a modem thermal management system, in accordance with an exemplary embodiment.

The word "exemplary" is used herein to mean "serving as an example, instance, or illustration." Any aspect described herein as "exemplary" is not necessarily to be construed as preferred or advantageous over other aspects.

Wireless communication systems are widely deployed to provide various telecommunication services such as telephony, video, data, messaging, and broadcasts, Typical wireless communication systems may employ multiple-access technologies capable of supporting communication with multiple users by sharing available system resources (e.g., bandwidth, transmit power). Examples of such multiple-access technologies include code division multiple access ("CDMA") systems, time division multiple access ("TDMA") systems, frequency division multiple access ("FDMA") systems, orthogonal frequency division multiple access ("OFDMA") systems, single-carrier frequency division multiple access ("SC-FDMA") systems, and time division synchronous code division multiple access ("TD-SCDMA") systems.

These multiple access technologies have been adopted in various telecommunication standards to provide a common protocol that enables different wireless devices to communicate on a municipal, national, regional, and even global level. An example telecommunication standard is Long Term Evolution ("LTE"). An example of an advancement to LTE technology is referred to as 5G. The term 5G represents an advancement of LTE technology including, for example, various advancements to the wireless interface, processing improvements, and the enablement of higher bandwidth to provide additional features and connectivity.

By way of example, a wireless multiple-access communication system may include a number of base stations (which in some examples may be referred to as eNodeBs or eNBs), each simultaneously supporting communication for multiple communication devices, otherwise known as user equipments ("UE"s). A base station may communicate with UEs on downlink channels (e.g., for transmissions from a base station to a UE) and uplink channels (e.g., for transmissions from a UE to a base station).

The term "portable computing device" ("PCD") is used herein to describe any device operating on a limited capacity power supply, such as a battery. A PCD is an example of a UE. Although battery operated PCDs have been in use for decades, technological advances in rechargeable batteries coupled with the advent of third generation ("3G") and fourth generation ("4G") wireless technology have enabled numerous PCDs with multiple capabilities. Examples of PCDs include a cellular telephone, a satellite telephone, a pager, a personal digital assistant ("PDA"), a smartphone, a navigation device, a smartbook or reader, a media player, a combination of the aforementioned devices, or a laptop or tablet computer with a wireless connection, among others.

The terms "component," "system," "subsystem," "module," "database," and the like are used herein to refer to a computer-related entity, either hardware, firmware, or a combination of hardware and firmware. For example, a component may be, but is not limited to being, a processor of portion thereof; a processor or portion thereof as configured by a program, process, object, thread, executable, etc. A component may be localized on one system and/or distributed between two or more systems.

The terms "application" or "application program" may be used synonymously to refer to a software entity having executable content, such as object code, scripts, byte code, markup language files, patches, etc. In addition, an "application" may further include files that are not executable in nature, such as data files, configuration files, documents, etc.

The terms "central processing unit" ("CPU"), "digital signal processor" ("DSP"), and "graphics processing unit" ("GPU") are non-limiting examples of processors that may reside in a PCD. These terms are used interchangeably herein except where otherwise indicated.

As illustrated in FIG. 1, in an illustrative or exemplary embodiment, a system 100 may include, among other elements (not shown for purposes of clarity), one or more antennas 102, a modem 104, a processor 106, and a memory 108. The system 100 may be a portion of a UE. The system 100 also may include a Thermal Mitigation Engine ("TME") 110. The modem 104, processor 106, memory 108, and TME 110 each may be in communication, directly or indirectly, with each other via one or more buses 112. The modem 104 may be configured to implement bidirectional wireless communications via the antennas 102 with base stations (e.g., eNBs), other UEs, or other wireless communication devices (not shown).

The modem 104 may include an RF processing module 114, a transmitter ("TX") 116, and a receiver ("RX") 118. These components may collectively modulate data packets and provide the modulated data packets at radio frequencies to the antennas 102 for transmission, as well as demodulate data packets received from the antennas 102.

The transmitter 116 and receiver 118 may include processors (not shown) that control various modem functions. For example, the transmitter 116 may include a Multiple-Input Multiple-Output ("MIMO") processor (not shown) configured to perform spatial processing (e.g., precoding) on data symbols, control symbols, and/or reference symbols, and may provide output symbol streams to modulators for transmission. Similarly, the receiver 118 may include a MIMO detector (not shown) configured to obtain received symbols from demodulators, perform MIMO detection on the received symbols, and provide detected symbols.

The transmitter 116 and receiver 118 may include other processors configured to control monitoring and decoding of secondary cells ("SCells") in association with a carrier aggregation ("CA") mode. A UE operating in a CA mode may be configured to aggregate certain functions of multiple carriers, such as control and feedback functions, on the same carrier, which may be referred to as primary component carriers. The network entities, eNBs, access points, and the like that communicate with a UE using the primary component carriers are referred to as primary cells or "PCells." The remaining carriers that depend on the primary carrier for support are referred to as "secondary component carriers." The network entities, eNBs, access points, and the like that communicate with a UE using the secondary component carriers are referred to as "secondary cells" or "SCells."

Although the TME 110 may be a separate component (e.g., hardware) as shown in FIG. 1, alternatively or in addition, corresponding TME software (or firmware) 120 may be stored in memory 108. Processor 106, as configured with the TME software 120, may provide some of the functionality described below with regard to the TME 110. In still other embodiments (not shown), such a TME may be primarily or even entirely embodied in one or more processors configured with software. In embodiments in which a processor is configured with software, instructions, logic, etc., the combination of such software, instructions, logic, etc., and the memory in which it is stored or otherwise resides in non-transitory, computer-executable form, comprises a "computer program product" or portion thereof, as that term is understood in the patent lexicon.

The system 100 may further include one or more junction thermal sensors 122 and one or more skin thermal sensors 124. A junction thermal sensor 122 may be located on a portion of a chip (e.g., a modem chip), while a skin thermal sensor 124 may be located on the housing or skin of a PCB or other UE in which the modem 104 is contained. The TME 110 is configured to receive temperature measurements from the junction thermal sensors 122 and skin thermal sensors 124. The TME 110 may sample a temperature associated with the modem 104 on a periodic basis, such as once every T seconds (where T may be any number, such as, for example, a fraction less than one). The TME 110 may collect and store multiple samples (i.e., temperature measurements) along with data indicating the time at which each sample was measured or collected or otherwise indicating relative measurement or collection times among the samples.

As described below in further detail, the TME 110 may apply modem-specific thermal mitigation actions. The TME 110 applies thermal mitigation actions to the modem 104 that are usually different compared to thermal mitigation actions which may be applied to processors, such as a CPU, CPU, etc., involving dynamic voltage and frequency scaling ("DVFS").

As understood by one of ordinary skill in the art, DVFS techniques may adjust the frequency and voltage applied to a processor or similar device to achieve a desired combination of processor performance level and processor power consumption level (or thermal energy generation level). While applying DVFS to processors and similar devices may be effective, directly applying DVFS to a modem may hamper essential modem functionality. The thermal management methods and systems described herein may provide effective modem thermal mitigation while preserving essential modem functionality.

Figure 2:
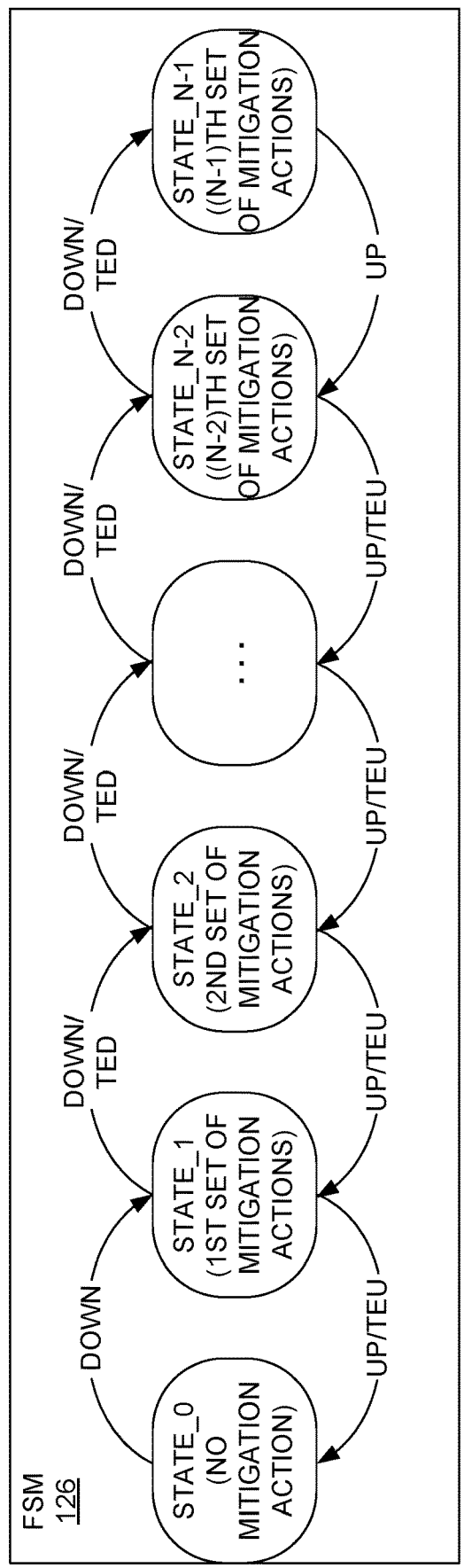
FIG. 2 is a state machine diagram for the state machine of the thermal mitigation engine of FIG. 1, in accordance with an exemplary embodiment.

The TME 110 may include a finite state machine ("FSM") 126, an Up timer 128, and a Down timer 130. As illustrated in FIG. 2, the FSM 126 has a number ("N") of states, STATE_0, STATE_1, STATE_2, etc., through STATE_N−2 and lastly STATE_N−1 (with additional states that may exist between STATE_2 and STATE N−2 but are not individually shown in FIG. 2 for purposes of clarity being indicated by the ellipsis (" . . . ") symbol). The number N may be any integer greater than or equal to two. STATE_0 is an initial state in which the FSM 126 begins operation (e.g., upon a UE booting up).

It is noted that each timing value described below may be set independently of all other timing values and may be different from all other timing values (including the opposite timing value in the same state). As but on example, each of STATE_1 through STATE_N−1 is associated with two timing values: an Up timing value and a Down timing value.

The Up timing value associated with a state may differ from the Up timing value associated with another state, and the Down timing value associated with a state may differ from the Down timing value associated with another state. The Up timer 128 is configured to be loaded with a selected one of the Up timing values, and the Down timer 130 is configured to be loaded with a selected one of the Down timing values.

The Up timer 128 and Down timer 130 are each configured to count or otherwise determine whether some amount of time (or number clock cycles or other parameter related to time) associated with a selected one of the Up and Down timing values has elapsed. Although the Up timer 128 and Down timer 130 may comprise counters, such counters may be configured to count up to the timing value or, alternatively, count down from the timing value, as understood by one of ordinary skill in the art.

Each of STATE_1 through STATE_N−1 is associated with a set of one or more thermal mitigation actions. Examples of thermal mitigation actions are described below. There are no thermal mitigation actions associated with STATE_0. Generally, the range of states (e.g., STATE_1 through STATE_N−1) may correspond to a spectrum of sets of thermal mitigation actions. Closer to one end of the spectrum, such as closer to STATE_L the corresponding set of thermal mitigation actions may have a lesser impact on modem performance and power savings, while closer to the opposite end of the spectrum, such as closer to STATE_N−1, the corresponding set of thermal mitigation actions may have a greater impact on modem performance and accordingly save more power.

Sets in the middle of the spectrum may have a medium impact on modem performance and a medium impact on power savings. Also, the timing values used by Up timer 128 and Down timer 130 may be selected in relation to such a spectrum. Closer to the end of the spectrum at which the set of thermal mitigation actions have a lesser impact on modem performance, a shorter timing value may be used, while closer to the end of the speamm at which the set of thermal mitigation actions have a greater impact on modem performance, a longer timing value may be used.

In an example, a first pair of Up and Down timing values may be associated with STATE_1, a second pair of Up and Down timing values may be associated with STATE_2, etc., through an (N−1)th pair of Up and Down timing values that may be associated with STATE_N−1. Although in this example each pair of Up and Down timing values is associated with exactly one state, in other examples the same pair of Up and Down timing values may be associated with more than one state. Further, all timing values may be programmable.

The FSM 126 also may be configured to compare temperature measurements received from the thermal sensors 122 and 124 with two temperature thresholds: a High temperature threshold and a Low temperature threshold. The terms "High" and "Low" as used herein have no significance other than to denote that the temperature represented by the High temperature threshold is higher than the temperature represented by the Low temperature threshold. The High and Low temperature thresholds may represent any values of temperature (i.e., temperature levels).

Based on collected temperature measurements, the FSM 126 may be configured to determine whether a measured temperature, such as a junction temperature or a skin temperature, rises above or falls below one of the High and Low temperature thresholds. Typically, two temperature thresholds may be used in order to prevent rapid switching between states, but that in some alternative and exemplary implementations, the High and Low temperature thresholds may be the same.

The FSM 126 may be configured to operate in one of two modes: an Up mode and a Down mode. However, the FSM 126 may be initialized to begin operation (in STATE_0) in an initial or null mode that is neither the Up nor Down mode. In FIG. 2, permitted state transitions from one of STATE_0 through STATE_N−1 to another of STATE_0 through STATE_N−1 are indicated by arrows. That is, the arrows indicate the closed set of state transitions under which the FSM 126 is constrained to operate in the illustrated embodiment. State transitions that may occur while the FSM 126 is operating in the Down mode are indicated by an arrow labeled "DOWN," and state transitions that may occur while the FSM 126 is operating in the Up mode are indicated by an arrow labeled "UP" Note that STATE_0 through STATE_N−1 are arranged in a chain with respect to state transitions indicated by the DOWN" arrows and are correspondingly arranged in a chain with respect to state transitions indicated by the "UP" arrows.

The term "Down" also may relate to a mode in which the TME 110 may apply one or more thermal mitigation actions, some of which may result in a decrease or downward shift in UE performance (sometimes referred to as throttling). Similarly, the term "Up" also may relate to a mode in which the TME 110 may cease to apply one or more thermal mitigation actions, which may result in an increase or upward shift in UE performance.

At the end points (STATE_0 and STATE_N−1), instead of a adding a thermal mitigation action at end STATE_N−1, this highest mode may be held for an additional length of time as determined by the FSM 126 and/or TME 110 since additional thermal mitigation actions may not be available. Similarly, instead of removing a thermal mitigation action at end STATE_0 (where one cannot be removed since this is the lowest mode without any thermal mitigation action being applied), this lowest mode may be held/maintained for an additional length of time as appropriate and determined by the FSM 126 and/or TME 110.

A sequence of state transitions in the Down mode defines a "Down path" through the states (STATE_0-STATE_N−1), and a sequence of state transitions in the Up mode defines an "Up path" through the states. In response to the measured temperature rising above the High temperature threshold, the FSM 126 follows the Down path through the states, in tinted increments, until either the FSM 126 reaches STATE_N−1 or the measured temperature falls below the Low temperature threshold. Similarly, in response to the measured temperature falling below the Low temperature threshold, the FSM 126 follows the Up path through the states, in timed increments, until either the ESM 126 reaches STATE_0 or the measured temperature rises above the High temperature threshold.

Figure 3:
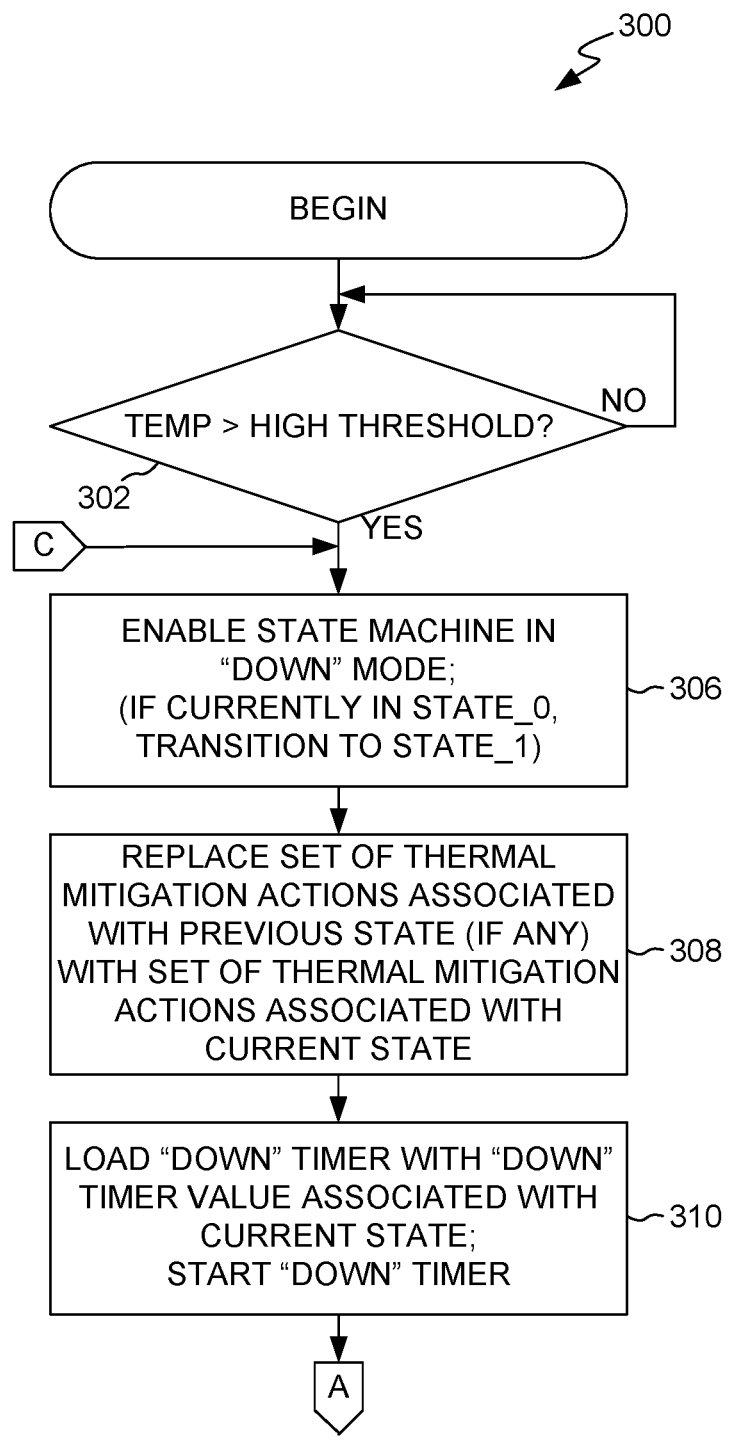
FIG. 3 is a flow diagram illustrating a portion of a method for modem thermal management, in accordance with an exemplary embodiment.
Figure 4:
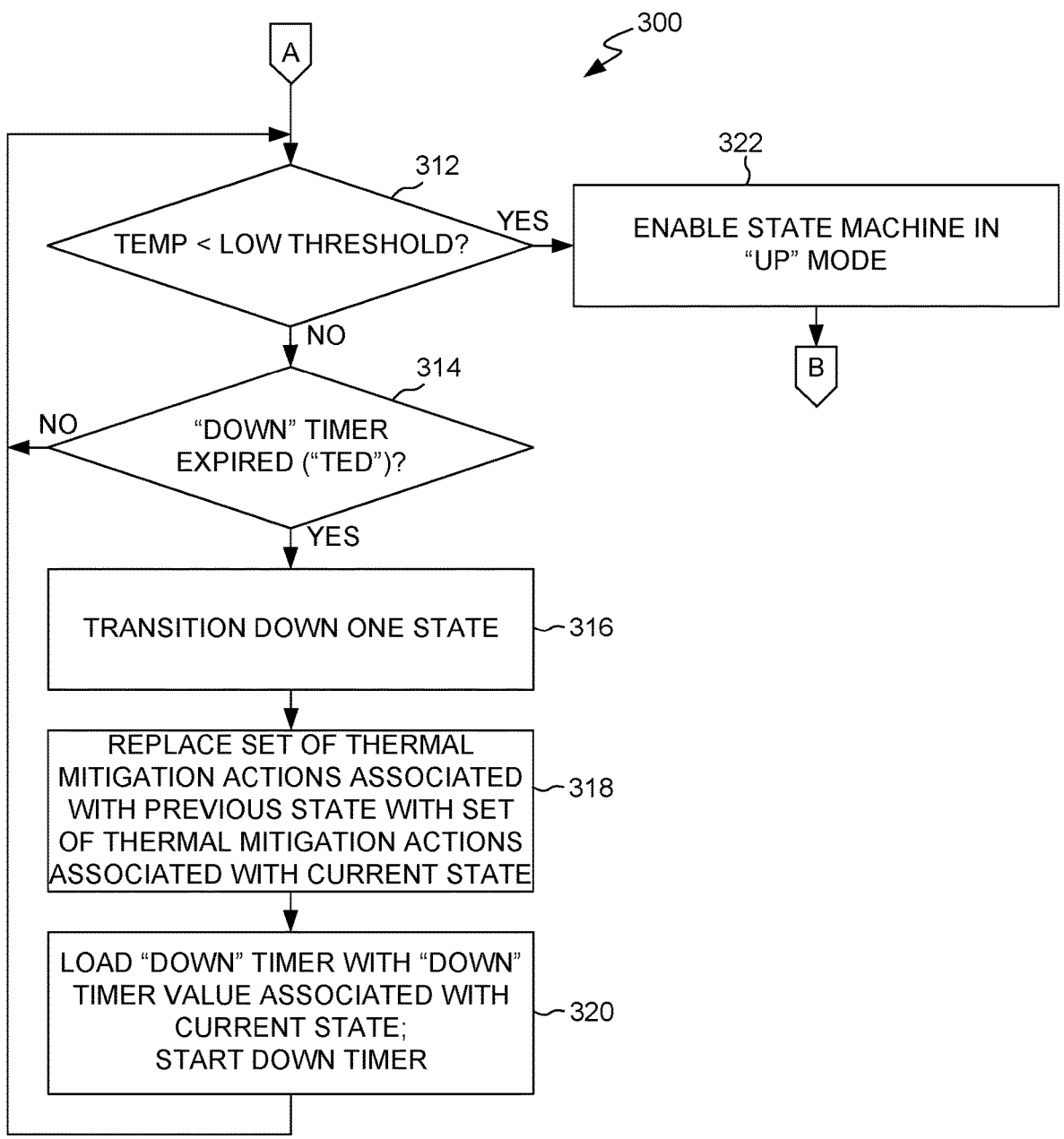
FIG. 4 is a continuation of the flow diagram of FIG. 3.
Figure 5:
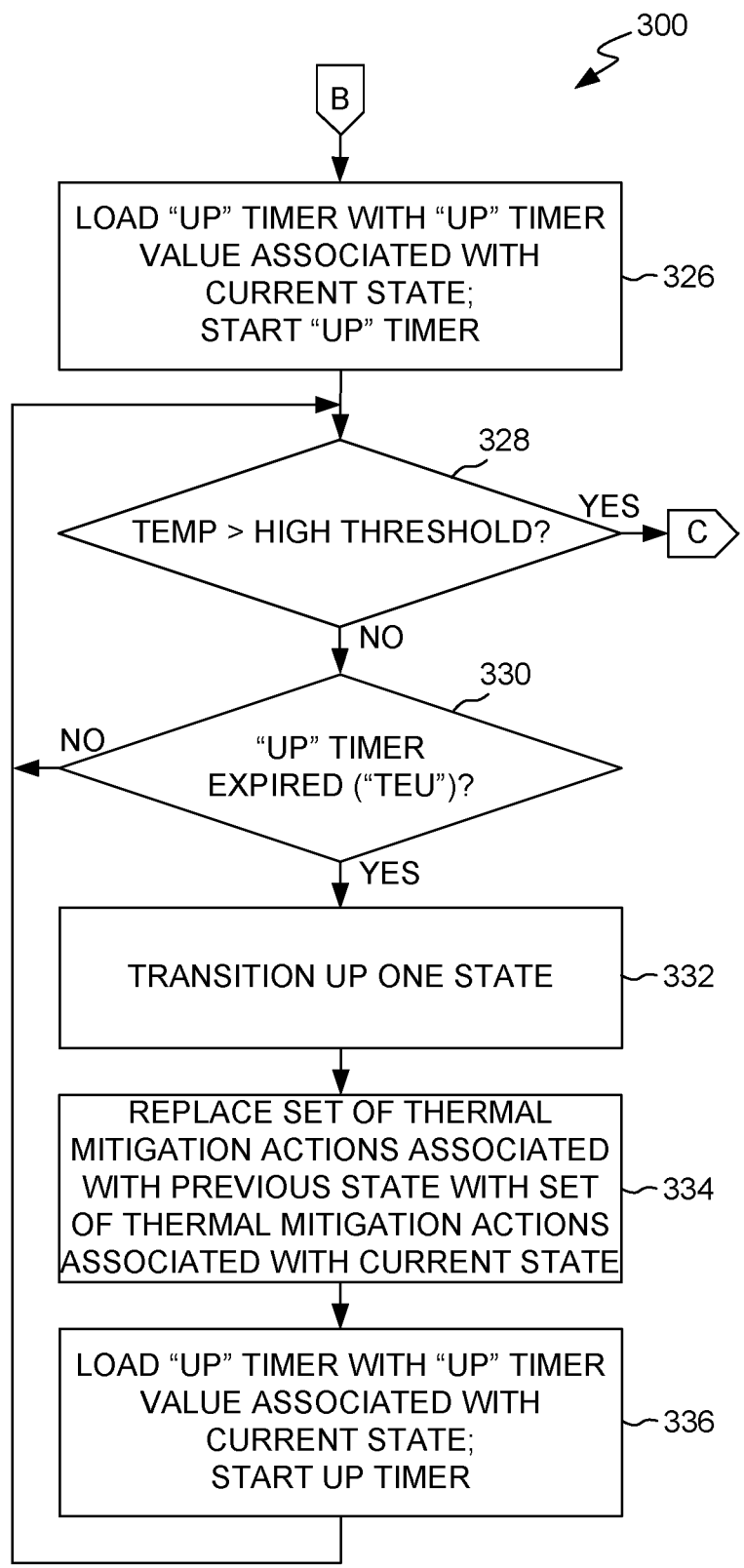
FIG. 5 is a continuation of the flow diagram of FIGS. 3-4.

As illustrated in FIGS. 3-5 which form a single flowchart the illustrates method 300, the FSM 126 may be configured to perform the method 300. The FSM 126 initially begins in STATE_0. As indicated by block 302, the FSM 126 may determine whether a measured temperature ("TEMP") has risen above the High temperature threshold. If the FSM 126 determines that the measured temperature has not risen above the High temperature threshold, then the FSM 126 may continue to monitor the measured temperature until the FSM 126 determines that the measured temperature has risen above the High temperature threshold.

If the FSM 126 determines that the measured temperature has risen above the High temperature threshold, then the FSM 126 enters the Down mode of operation, as indicated by block 306. In addition, if the ESM 126 is in STATE_0 when the FSM 126 enters the Down mode of operation, then the FSM 126 transitions to STATE_1.

After entering the Down mode, the FSM 126 may replace the set of one or more thermal mitigation actions associated with the previous state (if any) with the set of one or more thermal mitigations associated with the current state, as indicated by block 308. Note that if the FSM 126 was in STATE_0 when the FSM 126 entered the Down mode, then there were no thermal mitigation actions associated with the previous state, STATE_0. In the context of block 308, the "current state" is the state in which the ESM 126 is operating after any state transition (e.g., STATE_0 to STATE_1) associated with block 306. Replacing the set of one or more thermal mitigation actions associated with the previous state with the set of one or more thermal mitigation actions associated with the current state means that the FSM 126 initiates or applies the set of one or more thermal mitigation actions associated with the current state and ceases to apply the set of one or more thermal mitigation actions associated with the previous state.

After entering the Down mode (block 306), the FSM 126 may also load the Down timer 130 with the Down timing value associated with the current state, as indicated by block 310. The Down timer 130 is then started, i.e., the Down timer 130 begins timing. While the Down timer 130 is running, i.e., timing, the method 300 continues with block 312 in FIG. 4.

The FSM 126 may determine whether the measured temperature has fallen below the Low temperature threshold, as indicated by block 312. If the FSM 126 determines that the measured temperature has not fallen below the Low temperature threshold, then the FSM 126 may determine whether the Down timer 130 has expired ("TED"), i.e., an amount of time represented by the Down timing value has elapsed, as indicated by block 314. If the FSM 126 determines that the Down timer 130 has not expired, then the FSM 126 continues to monitor the Down timer 130 and the measured temperature until the FSM 126 either determines (block 312) that the measured temperature has fallen below the Low temperature threshold or determines (block 314) that the Down timer 130 has expired.

If the FSM 126 determines that the Down timer 130 has expired, then the FSM 126 transitions down one state, as indicated by block 316. The terms "down" and "up" with respect to state transitions refer to the directions indicated in FIG. 2 by arrows labeled "DOWN" and "UP," respectively. Note in FIG. 2 that an arrow labeled "TED" indicates a state transition that may occur in response to expiration of the Down timer 130 when the FSM 126 is operating in the Down mode.

After transitioning down one state (block 316), the FSM 126 may also replace the set of one or more thermal mitigation actions associated with the previous state with the set of one or more thermal mitigations associated with the current state, as indicated by block 318. As indicated by block 320, the FSM 126 may also load the Down timer 130 with the Down timing value associated with the current state, as indicated by block 320. The Down timer 130 is then started.

If the FSM 126 determines (block 312) that the measured temperature has fallen below the Low temperature threshold, then the FSM 126 switches from the Down mode to the Up mode, as indicated by block 322. The method 300 continues with block 326 in FIG. 5.

After switching from the Down mode to the Up mode, the FSM 126 may load the Up timer 128 with the Up timing value associated with the current state, as indicated by block 326. The Up timer 128 is then started. After switching from the Down mode to the Up mode, the FSM 126 maintains the set of one or more thermal mitigation actions associated with the current state until the Up timer 128 expires.

While the Up timer 128 is running the FSM 126 may determine whether the measured temperature has risen above the High temperature threshold, as indicated by block 328. If the FSM 126 determines that the measured temperature has not risen above the High temperature threshold, then the FSM 126 may determine whether the Up timer 128 has expired ("TEU"), i.e., an amount of time represented by the Up timing value has elapsed, as indicated by block 330. If the FSM 126 determines that the Up timer 128 has not expired, then the FSM 126 continues to monitor the Up timer 128 and the measured temperature until the FSM 126 either determines (block 328) that the measured temperature has risen above the High temperature threshold or determines (block 330) that the Up timer 128 has expired.

If the FSM 126 determines (block 330) that the Up timer 128 has expired, then the FSM 126 transitions up one state, as indicated by block 332. Note in FIG. 2 that an arrow labeled "TEU" indicates a state transition that may occur in response to expiration of the Up timer 128 when the FSM 126 is operating in the Up mode.

After transitioning up one state (block 332), the FSM 126 may also replace the set of one or more thermal mitigation actions associated with the previous state with the set of one or more thermal mitigations associated with the current state, as indicated by block 334. The FSM 126 may also load the Up timer 128 with the Up timing value associated with the current state, as indicated by block 336. The Up timer 128 is then started.

If the FSM 126 determines (block 328) that the measured temperature has risen above the High temperature threshold, then (returning to FIG. 3) the FSM 126 switches to the Down mode of operation, as indicated by block 306. The method 300 continues in the manner described above with regard to block 306.

In an embodiment having multiple temperature sensors, there may be a corresponding number of instances of the method 300 (FIGS. 3-5) operating in parallel, each based on a different measured temperature. For example, in an embodiment having both a junction thermal sensor 122 and a skin thermal sensor 124 there may be two instances of the method 300 operating in parallel, one using junction temperature and one using skin temperature. That is, one instance of the method 300 may be performed based on junction temperature measurements, while another instance of the method 300 may be performed in parallel based on skin temperature measurements. The two or more instances of method 300 may operate independently (e.g., controlled by a corresponding number of FSMs 126).

In an embodiment having multiple temperature sensors, the TME 110 may correspondingly include multiple FSMs 126. For example, in an embodiment having both a junction thermal sensor 122 and a skin thermal sensor 124, the TME 110 may correspondingly include two FSMs 126 (a second one of which is not shown for purposes of clarity). In such an embodiment, each of a first and a second FSM 126 may operate in the manner described above but with different temperature thresholds. Each of the first and second FSMs 126 may operate in the manner described above with regard to the method 300 but with different timing values. That is, the set of Up timing values associated with STATE_0 through STATE_N–1 of the first FSM 126 may differ from the set of Up timing values associated with STATE_1 through STATE_N–1 of the second FSM 126, and the set of Down timing values associated with STATE_0 through STATE_N–1 of the first FSM 126 may differ from the set of Down timing values associated with STATE_0 through STATE_N–1 of the second FSM 126.

Figure 7:
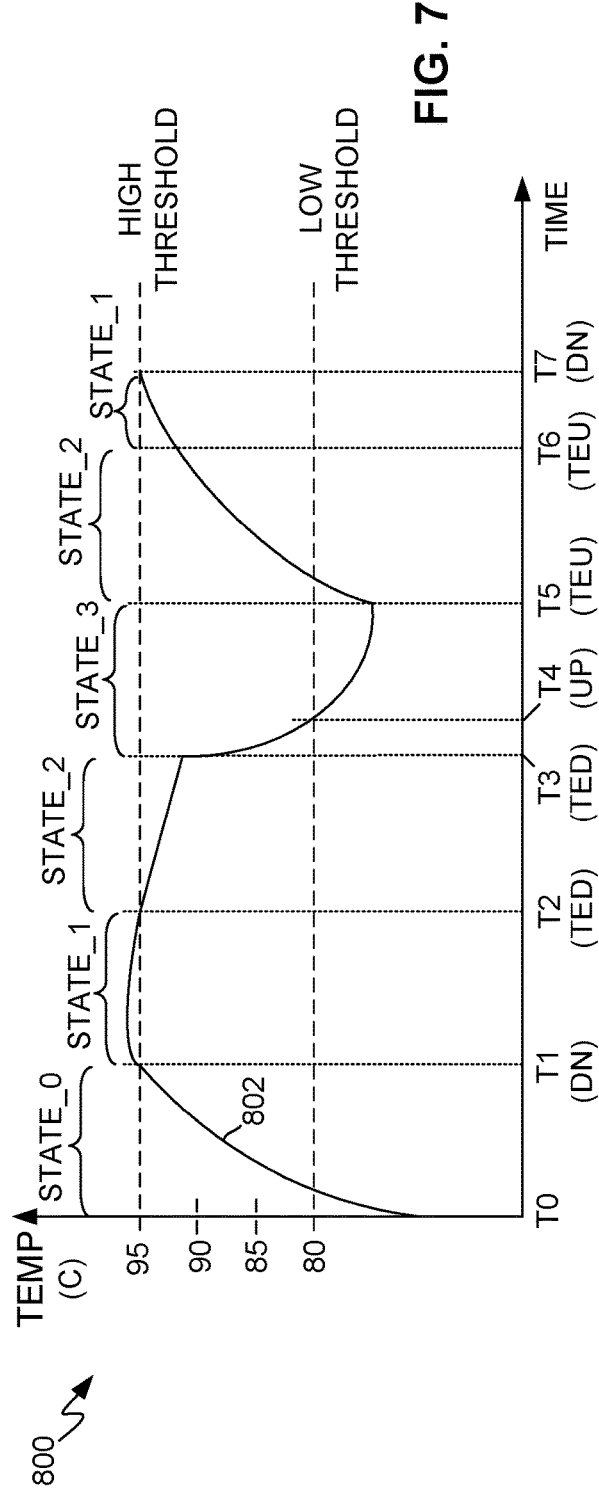
FIG. 7 is a graph that shows a measured temperature, such as a junction temperature as measured by the junction thermal sensor or a skin temperature as measured by the skin thermal sensor, over time.

In an example illustrated in FIG. 7, a graph 800 shows a measured temperature ("TEMP") 802, such as a junction temperature as measured by the junction thermal sensor 122 or a skin temperature as measured by the skin thermal sensor 124 (FIG. 1), over time. In this example, the High temperature threshold is 95C, and the Low temperature threshold is 80C.

Figure 6:
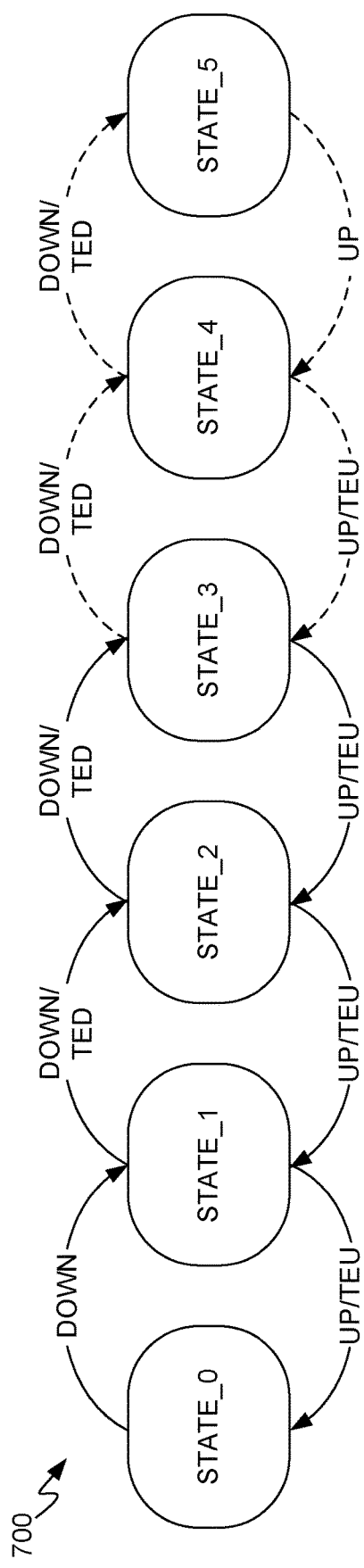
FIG. 6 illustrates a state configuration defined by six states.

In an example illustrated in FIG. 6, the FSM 126 may have a state configuration 700 defined by six states: STATE_0-STATE_5. The FSM 126 having this exemplary state configuration 700 operates as follows in response to the exemplary measured temperature 802.

Between time T0 (e.g., at UE initialization) and time T1 the measured temperature 802 increases from an initial value below the Low temperature threshold and continues to rise above the Low temperature threshold. At time T1, the measured temperature rises above the High temperature threshold. In response to determining that the measured temperature has risen above the High temperature threshold, the FSM 126 enters the Down mode ("DN"), transitions from STATE_0 to STATE_1, and loads and starts the Down timer 130. The FSM 126 also applies a set of thermal mitigation actions associated with STATE_1.

At time T2, the Down timer 130 expires ("TED"). In response to expiration of the Down timer 130, the FSM 126 transitions down one state from STATE_1 to STATE_2, loads the Down timer 130 with the Down timing value associated with STATE_2, and starts the Down timer 130. The FSM 126 also applies a set of thermal mitigation actions associated with STATE_2. That is, the FSM 126 replaces the set of thermal mitigation actions associated with STATE_1 with the set of thermal mitigation actions associated with STATE_2.

Then, at time T3 the Down timer 130 expires ("TED"). In response to expiration of the Down timer 130, the FSM 126 transitions down one state from STATE_2 to STATE_3, loads the Down timer 130 with the Down timing value associated with STATE_3, and starts the Down timer 130. The FSM 126 also applies a set of thermal mitigation actions associated with STATE_3. That is, the FSM 126 replaces the set of thermal mitigation actions associated with STATE_2 with the set of thermal mitigation actions associated with STATE_3.

At time T4, the measured temperature 802 falls below the Low temperature threshold. In response to determining that the measured temperature has fallen below the Low temperature threshold, the FSM 126 switches from the Down mode to the Up mode ("UP") and loads and starts the Up timer 128. Note that no state transition occurs in response to this condition. Accordingly, the FSM 126 remains in STATE_3 following time T4 and continues to apply the set of thermal mitigation actions associated with STATE_3.

At time T5, the Up timer 128 expires ("TEU"). In response to expiration of the Up timer 128, the FSM 126 transitions up one state from STATE_3 to STATE_2, loads the Up timer 128 with the Up timing value associated with STATE_2, and starts the Up timer 128. The FSM 126 also applies a set of thermal mitigation actions associated with STATE_2. That is, the FSM 126 replaces the set of thermal mitigation actions associated with STATE_3 with the set of thermal mitigation actions associated with STATE_2.

Then, at time T6 the U timer 128 expires ("TEU"). In response to expiration of the Up timer 128, the FSM 126 transitions up one state from STATE_2 to STATE_1, loads the Up timer 128 with the Down timing value associated with STATE_1, and starts the Up timer 128.

At time T7, the measured temperature again rises above the High temperature threshold. In response to determining that the measured temperature has risen above the High temperature threshold, the FSM 126 enters the Down mode ("DN") and otherwise behaves as described above with regard to the similar event at time T1. Note that in this example, the FSM 126 does not enter STATE_4 or STATE_5.

Figure 8:
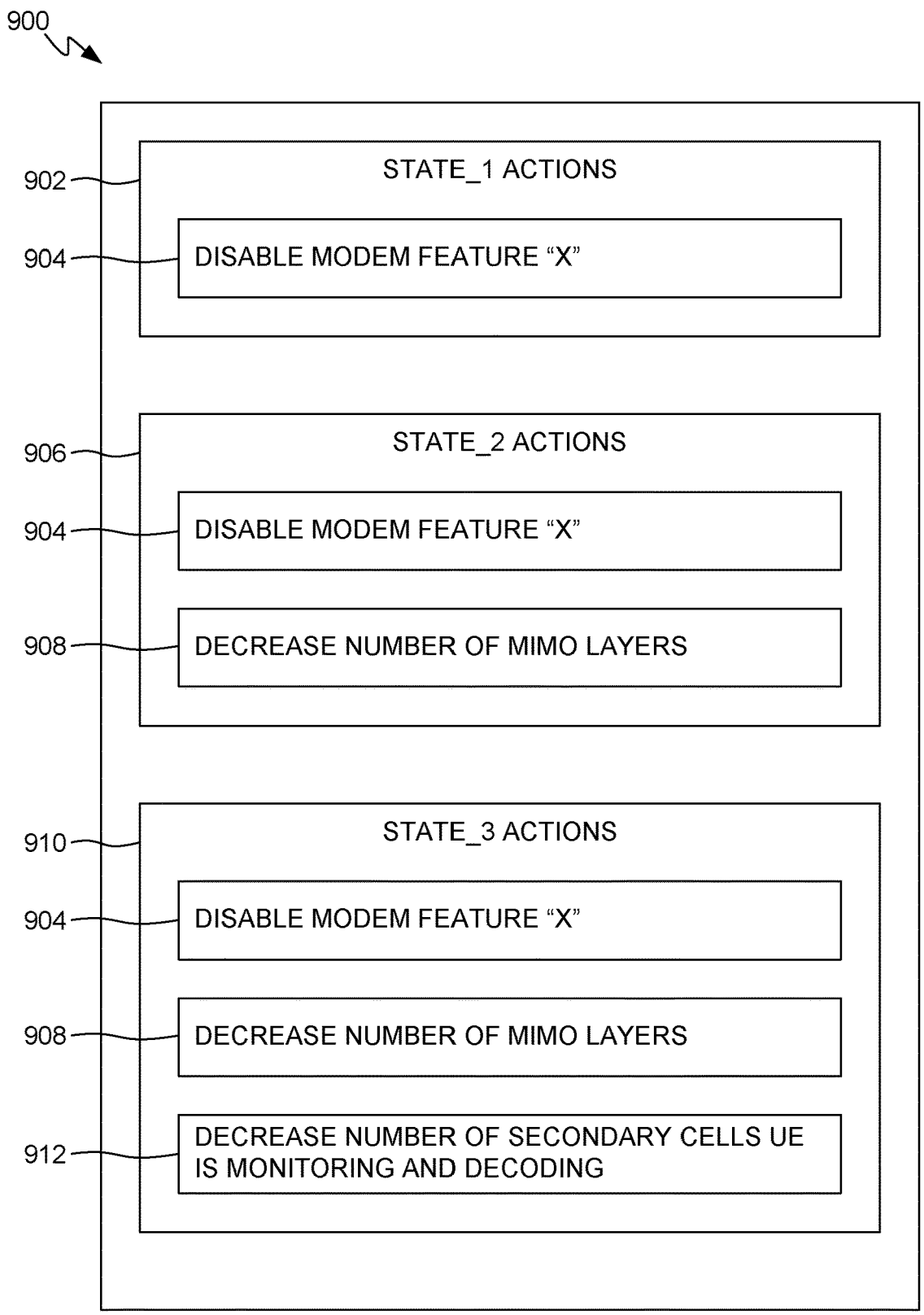
FIG. 8 is a table of sets of thermal mitigation actions, in accordance with an exemplary embodiment.

As illustrated in FIG. 8, a table 900 includes examples of sets of thermal mitigation actions. As described above, each set of thermal mitigation actions may be associated with one of STATE_1 through STATE_N–1.

A first set 902 of thermal mitigation actions may be associated with STATE_1. The first set 902 of thermal mitigation actions may consist of, for example, a first thermal mitigation action 904. The first thermal mitigation action 904 may consist of, for example, disabling a certain feature "X" of the modem 104 (FIG. 1).

A second set 906 of thermal mitigation actions may be associated with STATE_2. The second set 906 of thermal mitigation actions may consist of, for example, the above-described first thermal mitigation action 904 and a second thermal mitigation action 908. The second thermal mitigation action 908 may consist of, for example, using a first reduced subset of the available MIMO layers that the modem 104 (FIG. 1) may use. For example, a MIMO processor of the UE modem may report to an eNB a rank that is less than the true rank, which is a function of the measured spectral efficiency of the MIMO channel. For example, for thermal mitigation of a 4×4 MIMO use case, which utilizes a rank-4 MIMO channel, the UE may report to the eNB a lower rank of two instead of the true rank of four, in order to reduce the data rate by one-half. It may be noted that this second thermal mitigation action 908 may have a throttling effect of reducing throughput. The second thermal mitigation action 908 may be more aggressive or effective at mitigating adverse effects of thermal energy generation than the first thermal mitigation action 904.

A third set 910 of thermal mitigation actions may be associated with STATE_3. The third set 910 of thermal mitigation actions may consist of, for example, the above-described first thermal mitigation action 904, the above-described second thermal mitigation action 908, and a third thermal mitigation action 912. The third thermal mitigation action 912 may consist of, for example, monitoring a reduced subset of the secondary cells ("SCells") that the modem 104 (FIG. 1) may monitor. For example, for thermal mitigation of a 3CA, 600 Mbps, 2×2 MIMO on each component carrier, a processor of the LIE may report to the eNB a Channel Quality Indicator ("CQI") value of zero, and stop monitoring the Physical Downlink Control Channel ("PDCCH"). It may be noted that this third thermal mitigation action 912 may have a throttling effect of reducing both the downlink and uplink throughput, which may be more aggressive or severe than the throttling effect of the second thermal mitigation action 908. Correspondingly, the third thermal mitigation action 912 may be more aggressive or effective at mitigating adverse effects of thermal energy generation than the second thermal mitigation action 908.

Thermal mitigation actions 904, 908, and 912 are intended only as examples, and others will occur readily to one of ordinary skill in the art in view of the teachings herein. For example, in some implementations: (1) one or more of the mitigation actions may have the effect of reducing the operating frequency or voltage of the modem, (2) one or more voltages used and/or required by the modem may remain the same in different states, or (3) one or more clocks of the modem may remain the same in different states. Also, although in the foregoing example each successive set (i.e., in the down direction) of thermal mitigation actions subsumes the preceding set (and thus adds to the preceding set), in other embodiments the sets of thermal mitigation actions may be structured in other ways. Also, although in this example, each successively applied thermal mitigation action is more aggressive than the preceding thermal mitigation actions, in other embodiments there may be a different correlation (or no correlation) between the order in which thermal mitigation actions are applied and their relative aggressiveness.

Although only three sets 902, 906, and 910 of thermal mitigations actions are shown as examples the number of sets corresponds to the number of states. For example, in an embodiment in which the FSM 126 has six states STATE_0-STATE_5, such as in the example described above with regard to FIGS. 7-8, there would be five sets of thermal mitigation actions.

Referring again to the example described above with regard to FIGS. 6-7, applying the first set 902 (FIG. 8) of thermal mitigation actions associated with STATE_1 at time T1 may result in the exemplary behavior of the measured temperature 802 shown between time T1 and T2. In this time interval, the first thermal mitigation action 904 (e.g., disabling a certain modem feature) may, for example, slow the rate of increase in the measured temperature 802 shortly after time T2, and then cause the measured temperature 802 to begin decreasing. Applying the second set 906 (FIG. 8) of thermal mitigation actions associated with STATE_2 at time T2 may result in the exemplary behavior of the measured temperature 802 shown between time T2 and T3. In this time interval, the combination of the first thermal mitigation action 904 (e.g., disabling a certain modem feature) and second thermal mitigation action 908 (e.g. using a first reduced subset of the available MIMO layers) may, for example, slightly accelerate the decrease in the measured temperature 802. Applying the third set 910 (FIG. 8) of thermal mitigation actions associated with STATE_3 at time T3 may result in the exemplary behavior of the measured temperature 802 shown between time T3 and T4. In this time interval, the combination of the first thermal mitigation action 904 (e.g., disabling a certain modem feature), the second thermal mitigation action 908 (e.g. using a first reduced subset of the available MIMO layers), and the third thermal mitigation action 912 (e.g., monitoring a reduced subset of SCells) may, for example, more aggressively accelerate the decrease in the measured temperature 802.

As illustrated in FIGS. 9A, 9B, 9C, and 9D, another table 1100 includes examples of sets of thermal mitigation actions. Table 1100 lists nine states, STATE_1 through STATE_9, each associated with a set of thermal mitigation actions.

Figure 9A:
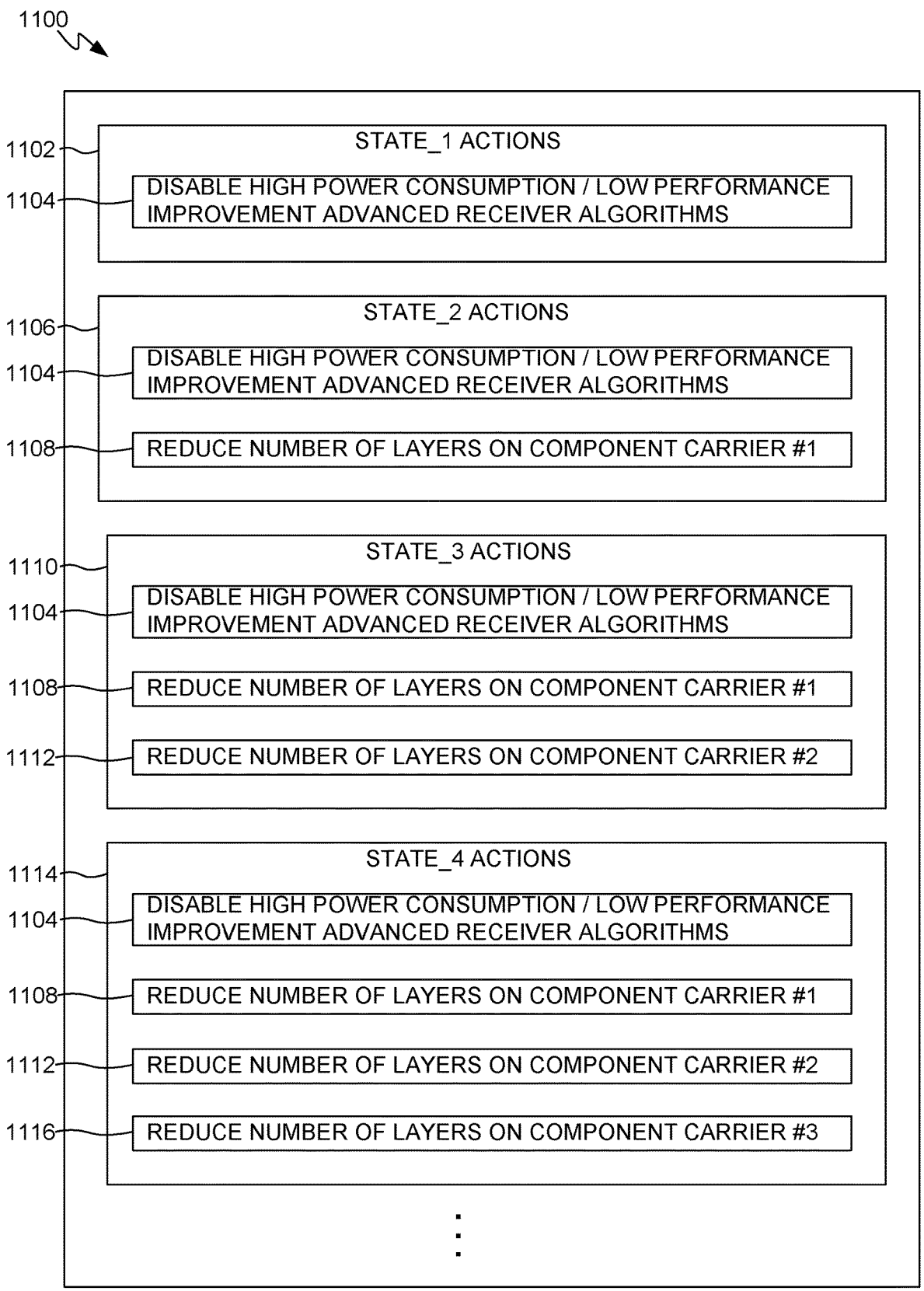
FIG. 9A is another table of sets of thermal mitigation actions, in accordance with an exemplary embodiment.

Referring to FIG. 9A, a first set 1102 of thermal mitigation actions may be associated with STATE_1. The first set 1102 of thermal mitigation actions may consist of, for example, a first thermal mitigation action 1104. The first thermal mitigation action 1104 may consist of, for example, disabling one or more advanced receiver functions that consume high amounts of power yet provide only slight modem performance improvements.

A second set 1106 of thermal mitigation actions may be associated with STATE_2. The second set 1106 of thermal mitigation actions may consist of, for example, the above-described first thermal mitigation action 1104 and a second thermal mitigation action 1108. The second thermal mitigation action 1108 may consist of, for example, reducing the number of layers on component carrier #1 in a 5G use case with four component carriers (#1-#4) and three secondary carriers (#1-#3).

A third set 1110 of thermal mitigation actions may be associated with STATE_3. The third set 1110 of thermal mitigation actions may consist of, for example, the above-described first thermal mitigation action 1104, the above-described second thermal mitigation action 1108, and a third thermal mitigation action 1112. The third thermal mitigation action 1112 may consist of, for example, reducing the number of layers on component carrier #2.

A fourth set 1114 of thermal mitigation actions may be associated with STATE_4. The fourth set 1114 of thermal mitigation actions may consist of, for example, the above-described first thermal mitigation action 1104, the above-described second thermal mitigation action 1108, the above-described third thermal mitigation action 1112, and a fourth thermal mitigation action 1116. The fourth thermal mitigation action 1116 may consist of, for example, reducing the number of layers on component carrier #3.

Figure 9B:
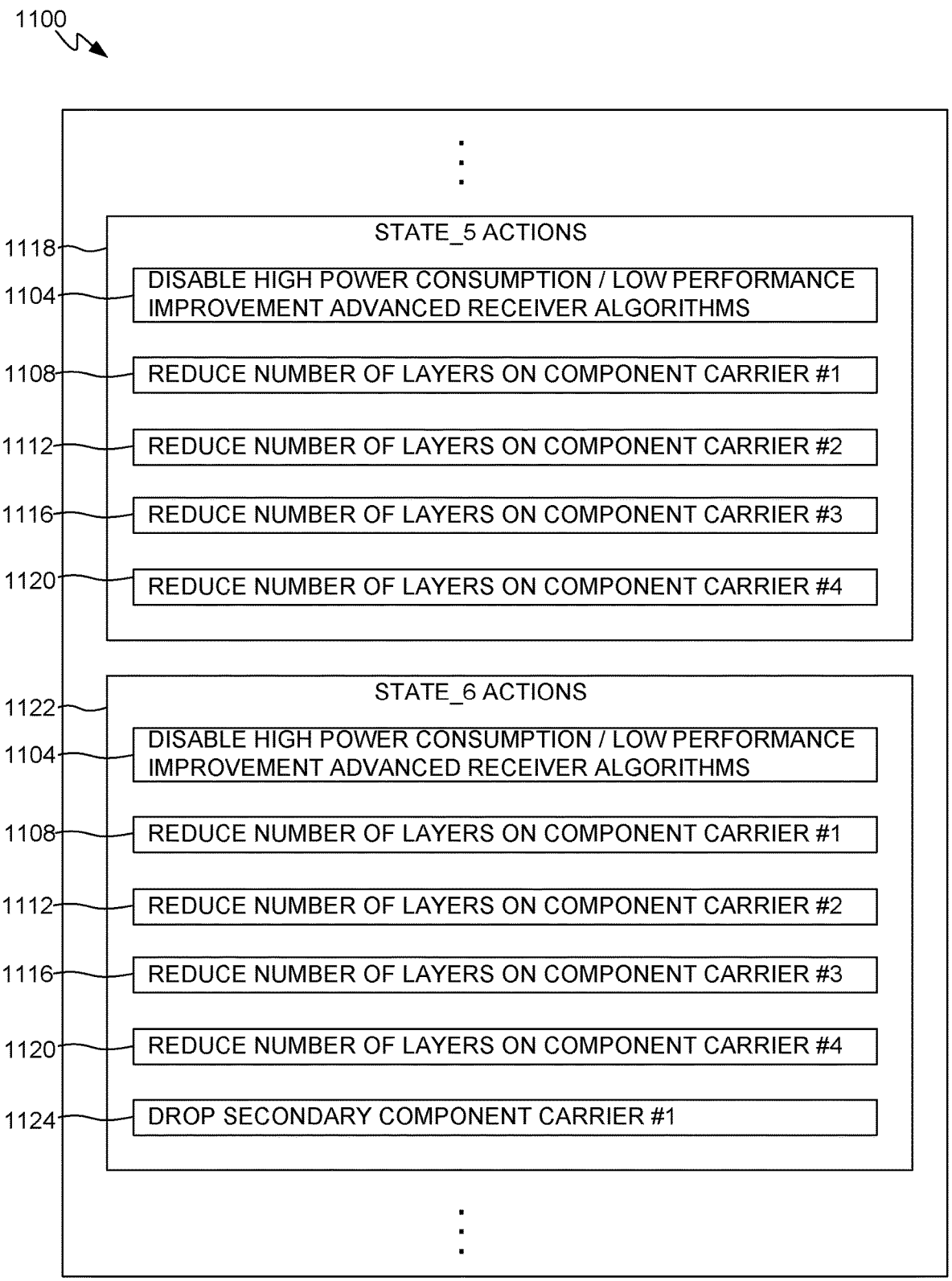
FIG. 9B is a continuation of the table of FIG. 9A.

Continuing on FIG. 9B, a fifth set 1118 of thermal mitigation actions may be associated with STATE_5. The fifth set 1118 of thermal mitigation actions may consist of, for example, the above-described first thermal mitigation action 1104, the above-described second thermal mitigation action 1108 the above-described third thermal mitigation action 1112, the above-described fourth thermal mitigation action 1116, and a fifth thermal mitigation action 1120. The fifth thermal mitigation action 1120 may consist of, for example, reducing the number of layers on component carrier #4.

A sixth set 1122 of thermal mitigation actions may be associated with STATE_6. The sixth set 1122 of thermal mitigation actions may consist of, for example, the above-described first thermal mitigation action 1104, the above-described second thermal mitigation action 1108, the above-described third thermal mitigation action 1112, the above-described fourth thermal mitigation action 1116, the above-described fifth thermal mitigation action 1120, and a sixth thermal mitigation action 1124. The sixth thermal mitigation action 1124 may consist of, for example, dropping secondary component carrier #1.

Figure 9C:
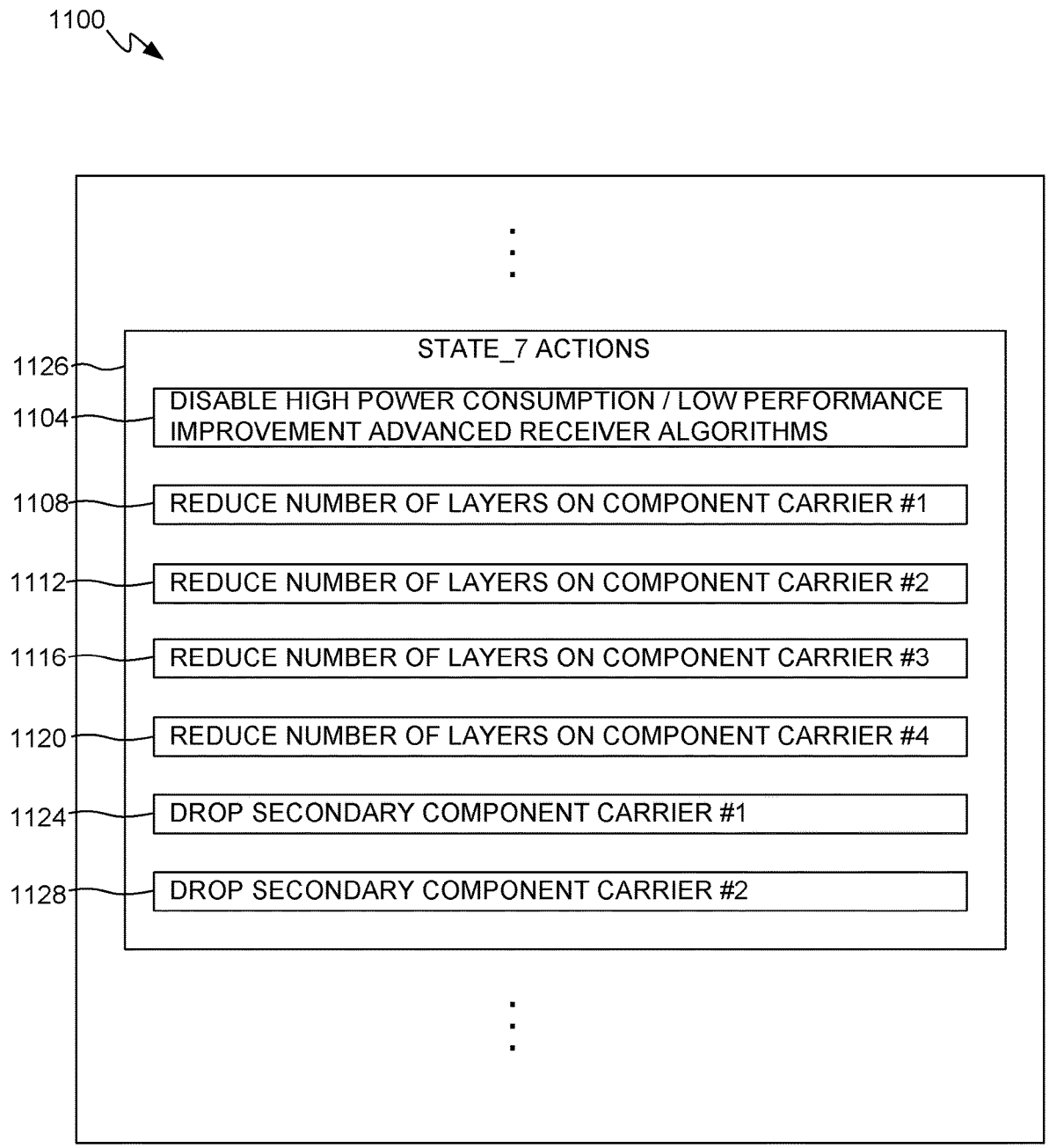
FIG. 9C is a continuation of the table of FIGS. 9A-9B.

Continuing on FIG. 9C, a seventh set 1126 of thermal mitigation actions may be associated with STATE_7. The seventh set 1126 of thermal mitigation actions may consist of, for example, the above-described first thermal mitigation action 1104, the above-described second thermal mitigation action 1108, the above-described third thermal mitigation action 1112, the above-described fourth thermal mitigation action 1116, the above-described fifth thermal mitigation action 1120, the above-described sixth thermal mitigation action 1124, and a seventh thermal mitigation action 1128. The seventh thermal mitigation action 1128 may consist of, for example, dropping secondary component carrier #2.

Figure 9D:
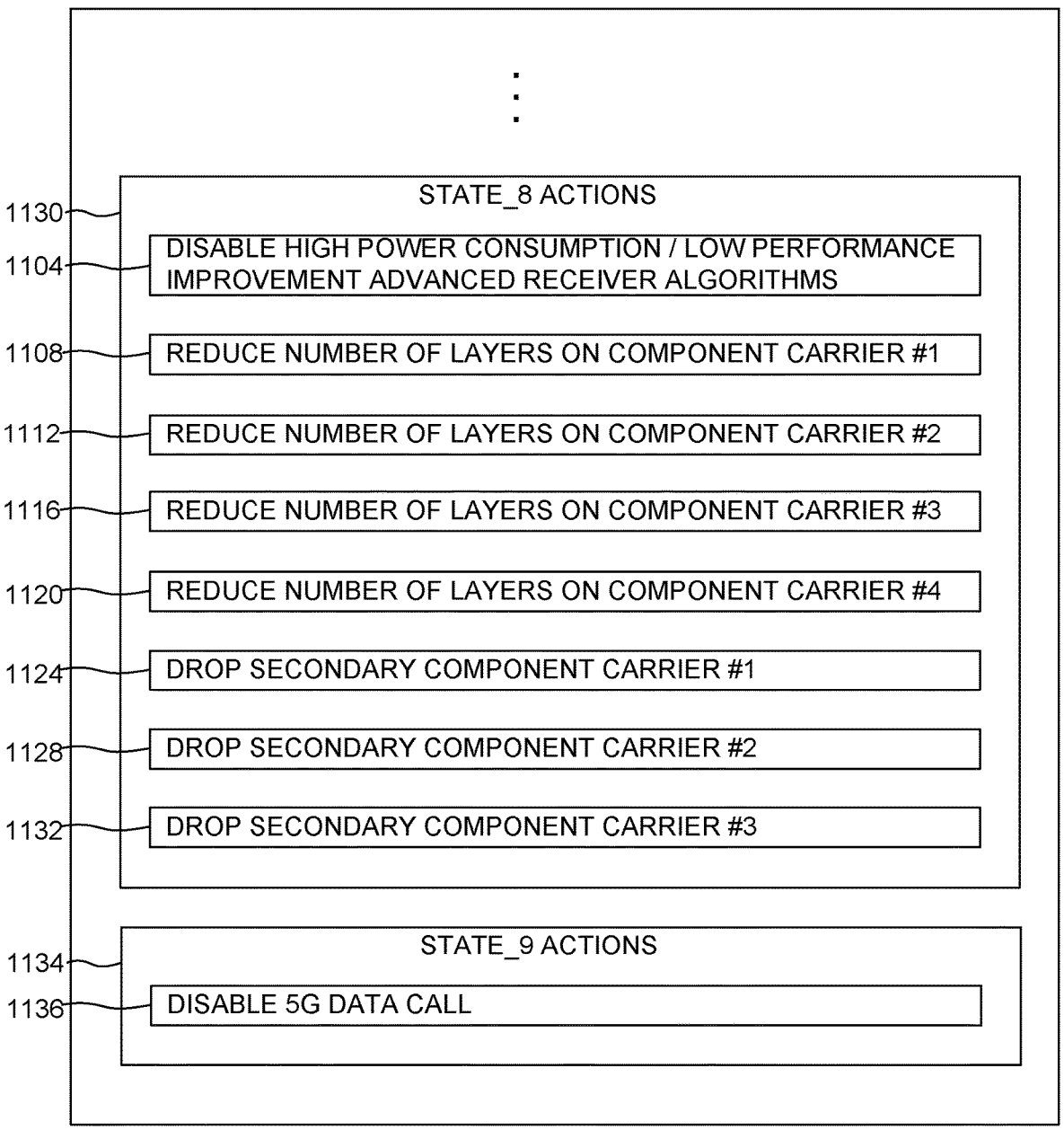
FIG. 9D is a continuation of the table of FIGS. 9A-9C.

Continuing on FIG. 9D, an eighth set 1130 of thermal mitigation actions may be associated with STATE_8. The eighth set 1130 of thermal mitigation actions may consist of, for example, the above-described first thermal mitigation action 1104, the above-described second thermal mitigation action 1108, the above-described third thermal mitigation action 1112, the above-described fourth thermal mitigation action 1116, the above-described fifth thermal mitigation action 1120, the above-described sixth thermal mitigation action 1124, the above-described seventh thermal mitigation action 1128, and an eighth thermal mitigation action 1132. The eighth thermal mitigation action 1132 may consist of, for example, dropping secondary component carrier #3.

A ninth set 1134 of thermal mitigation action may be associated with STATE_9. The ninth thermal mitigation action 1136 may consist of, for example, disabling the 5G data call that is then being processed by the modem (i.e., the data call to which the above-referenced component carriers relate). Disabling the data call, in some instances, may have a greater impact on modem performance and provides greater power savings than all the above-described thermal mitigation actions, even when all the above-described thermal mitigation actions are combined together.

Figure 10:
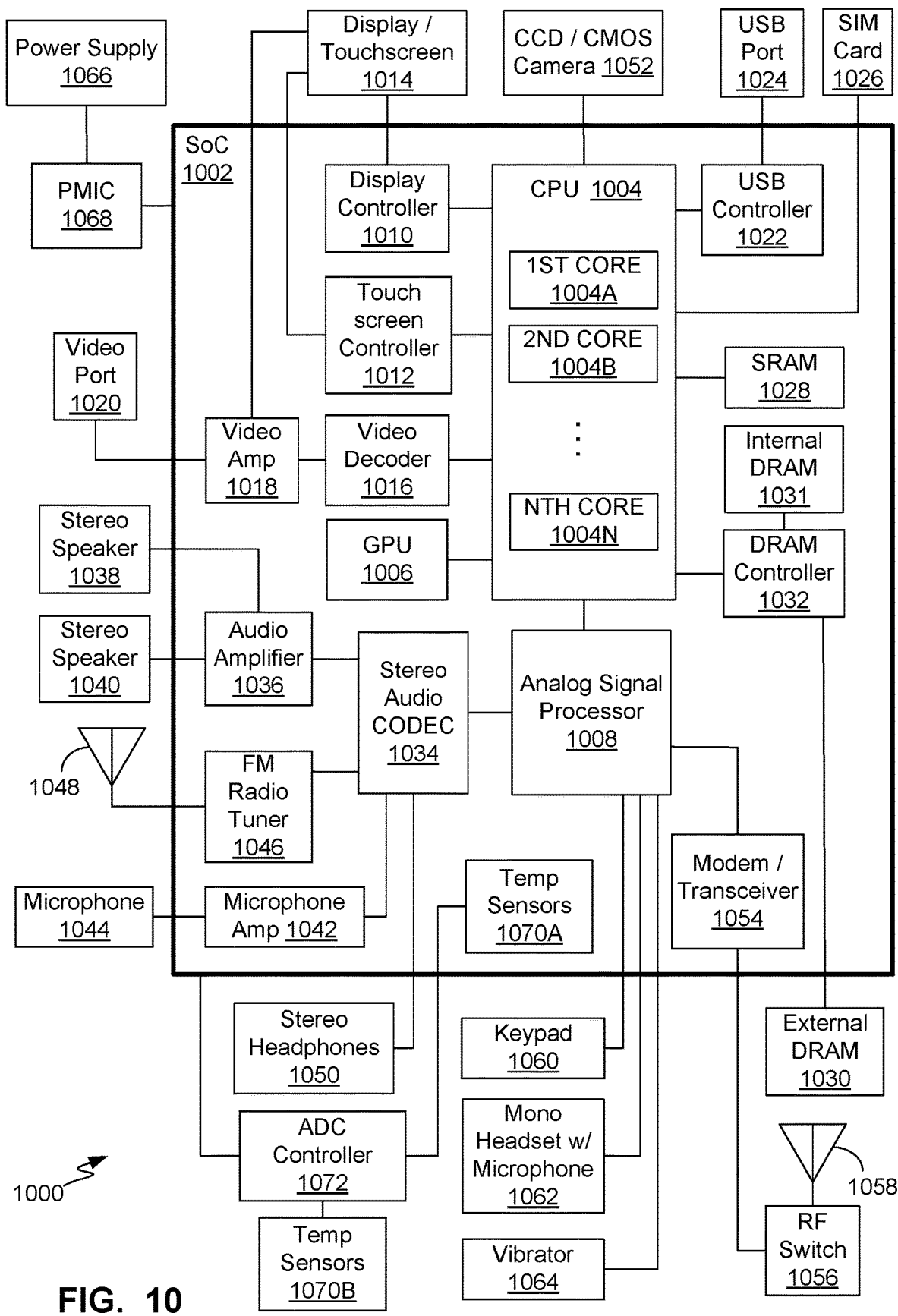
FIG. 10 is a block diagram of a PCD or similar UE, in accordance with an exemplary embodiment.

As illustrated in FIG. 10, in illustrative or exemplary embodiments, systems, methods, and computer program products for modem thermal management may be embodied in a PCD 1000. The PCD 1000 includes a system on chip ("SoC") 1002, i.e., a system embodied in an integrated circuit chip. The SoC 1002 may include a central processing unit ("CPU") 1004, a graphics processing unit ("GPU") 1006, or other processors. The CPU 1004 may include multiple cores, such as a first core 1004A, a second core 1004B, etc., through an Nth core 1004N. The SoC 1002 may include an analog signal processor 1008.

A display controller 1010 and a touchscreen controller 1012 may be coupled to the CPU 1004. A touchscreen display 1014 external to the SoC 1002 may be coupled to the display controller 1010 and the touchscreen controller 1012. The PCD 1000 may further include a video decoder 1016.

The video decoder 1016 is coupled to the CPU 1004. A video amplifier 1018 may be coupled to the video decoder 1016 and the touchscreen display 1014. A video port 1020 may be coupled to the video amplifier 1018. A universal serial bus ("USB") controller 1022 may also be coupled to CPU 1004, and a USB port 1024 may be coupled to the USB controller 1022. A subscriber identity module ("SIM") card 1026 may also be coupled to the CPU 1004.

One or more memories may be coupled to the CPU 1004. The one or more memories may include both volatile and non-volatile memories. Examples of volatile memories include static random access memory ("SRAM") 1028 and dynamic RAMs ("DRAM"'s) 1030 and 1031. Such memories may be external to the SoC 1002, such as the DRAM 1030, or internal to the SoC 1002, such as the DRAM 1031. A DRAM controller 1032 coupled to the CPU 1004 may control the writing of data to, and reading of data from, the DRAMs 1030 and 1031. In other embodiments, such a DRAM controller may be included within a processor, such as the CPU 1004.

A stereo audio CODEC 1034 may be coupled to the analog signal processor 1008. Further, an audio amplifier 1036 may be coupled to the stereo audio CODEC 1034. First and second stereo speakers 1038 and 1040, respectively, may be coupled to the audio amplifier 1036. In addition, a microphone amplifier 1042 may be coupled to the stereo audio CODEC 1034, and a microphone 1044 may be coupled to the microphone amplifier 1042. A frequency modulation ("FM") radio tuner 1046 may be coupled to the stereo audio CODEC 1034. An FM antenna 1048 may be coupled to the FM radio tuner 1046. Further, stereo headphones 1050 may be coupled to the stereo audio CODEC 1034. Other devices that may be coupled to the CPU 1004 include a digital CCD or CMOS) camera 1052.

A modem or radio frequency ("RF") transceiver 1054 may be coupled to the analog signal processor 1008. The modem or RF transceiver 1054 may be an example of the above-described modem 104 (FIG. 1). An RF switch 1056 may be coupled to the RF transceiver 1054 and an RF antenna 1058. In addition, a keypad 1060, a mono headset with a microphone 1062, and a vibrator device 1064 may be coupled to the analog signal processor 1008.

A power supply 1066 may be coupled to the SoC 1002 via a power management integrated circuit ("PMIC") 1068. The power supply 1066 may include a rechargeable battery or a DC power supply that is derived from an AC-to-DC transformer connected to an AC power source.

The SoC 1002 may have one or more internal or on-chip thermal sensors 1070A and may be coupled to one or more external or off-chip thermal sensors 1070B. The one or more of on-chip thermal sensors 1070A may be examples of junction thermal sensor 122 (FIG. 1). The one or more of off-chip thermal sensors 1070B may be examples of skin thermal sensor 124 (FIG. 1). An analog-to-digital converter ("ADC") controller 1072 may convert voltage drops produced by the thermal sensors 1070A and 1070B to digital signals.

The touch screen display 1014, the video port 1020, the USB port 1024, the camera 1052, the first stereo speaker 1038, the second stereo speaker 1040, the microphone 1044, the FM antenna 1048, the stereo headphones 1050, the RF switch 1056, the RF antenna 1058, the keypad 1060, the mono headset 1062, the vibrator 1064, the thermal sensors 1070B, the PMIC 1068, the power supply 1066, the DRAM 1030, and the SIM card 1026 are external to the SoC 1002 in this exemplary or illustrative embodiment. It will be understood, however, that in other embodiments one or more of these devices may be included in such an SoC.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for thermal management, comprising:
   monitoring a temperature associated with a modem;
   changing a mode of a component to a down mode in response to determining the temperature increased above a high threshold, the down mode comprising one or more thermal mitigation actions for decreasing thermal activity of the modem;
   checking both a down timer and the temperature associated with the modem during the down mode of the component, the down timer is associated with the down mode and comprising a first finite period of time, the temperature associated with the modem being checked during the first finite period of time while in the down mode;
   changing the mode of the component to an up mode in response to determining the temperature decreased below a low threshold, the up mode comprising one or more actions for increasing thermal activity of the modem;
   checking both an up timer and the temperature associated with the modem during the up mode of the component, the up timer is associated with the up mode and comprising a second finite period of time, the temperature associated with the modem being checked during the second finite period of time while in the up mode; and
   transitioning a current state of the component to a new state of a plurality of states in response to expiration of at least one of the up timer or the down timer, each of the plurality of states associated with different thermal mitigation actions, wherein a timing value of at least one of the down timer or the up timer associated with a first state of the plurality of states is different than for a second state of the plurality of states.

2. The method of claim 1, wherein each state of the plurality of states is associated with at least one of an up mode timing value and a down mode timing value.

3. The method of claim 1, further comprising:
   transitioning the current state of the component in a down direction in response to expiration of the down timer such that additional thermal mitigation actions for the modem are executed; and
   transitioning the current state of the component in an up direction in response to expiration of the up timer such that additional actions increasing thermal activity of the modem are executed.

4. The method of claim 1, wherein the one or more thermal mitigation actions includes using a first reduced subset of the available Multiple-Input Multiple-Output (MIMO) layers.

5. The method of claim 1, wherein the one or more thermal mitigation actions includes monitoring a reduced subset of secondary cells (SCells).

6. The method of claim 1, wherein monitoring a temperature associated with a modem comprises at least one of:
   monitoring a junction temperature; and
   monitoring a skin temperature.

7. The method of claim 1, wherein one or more first thermal mitigation actions associated with the first state have less impact on modem performance than one or more second thermal mitigation actions associated with the second state, wherein the timing value of the at least one of the down tinier or the up timer associated with the first state is less than for the second state.

8. The method of claim 1, wherein a first timing value associated with the down timer is different than a second timing value associated with the up timer.

9. A system for thermal management, comprising:
   at least one thermal sensor; and
   a component configured to control:
     monitoring a temperature associated with a modem;
     changing a mode of the component to a down mode in response to determining the temperature increased above a high threshold, the down mode comprising one or more thermal mitigation actions for decreasing thermal activity of the modem;
     checking both a down timer and the temperature associated with the modem during the down mode, the down timer is associated with the down mode and comprising a first finite period of time, the temperature associated with the modem being checked during the first finite period of time while in the down mode;
     changing the mode of the component to an up mode in response to determining the temperature decreased below a low threshold, the up mode comprising one or more actions for increasing thermal activity of the modem;
     checking both an up timer and the temperature associated with the modem during the up mode, the up timer is associated with the up mode and comprising a second finite period of time, the temperature associated with the modem being checked during the second finite period of time while in the up mode; and
     transitioning a current state of the component to a new state of a plurality of states in response to expiration of at least one of the up timer or the down timer, each of the plurality of states associated with different thermal mitigation actions, wherein a timing value of at least one of the down timer or the up timer associated with a first state of the plurality of states is different than for a second state of the plurality of states.

10. The system of claim 9, wherein:
    the component is configured to control setting the up timer and the down timer.

11. The system of claim 9, wherein each state of the plurality of states is associated with at least one of an up mode timing value and a down mode timing value.

12. The system of claim 9, wherein the component is further configured to control:
    transitioning the current state of the component in a down direction in response to expiration of the down tinier such that additional thermal mitigation actions for the modem are executed; and
    transitioning the current state of the component in an up direction in response to expiration of the up timer such that additional actions increasing thermal activity of the modem are executed.

13. The system of claim 9, wherein the one or more thermal mitigation actions includes using a first reduced subset of the available Multiple-Input Multiple-Output (MIMO) layers.

14. The system of claim 9, wherein the one or more thermal mitigation actions includes monitoring a reduced subset of secondary cells (SCells).

15. The system of claim 9, wherein the at least one thermal sensor comprises one or more of:
   a junction thermal sensor; and
   a skin thermal sensor.

16. The system of claim 9, wherein one or more first thermal mitigation actions associated with the first state have less impact on modem performance than one or more second thermal mitigation actions associated with the second state, wherein the timing value of the at least one of the down timer or the up timer associated with the first state is less than for the second state.

17. The system of claim 9, wherein a first timing value associated with the down timer is different than a second timing value associated with the up timer.

* * * * *